No. 652,917. Patented July 3, 1900.
G. MEINHARDT.
DISK SHARPENER.
(Application filed Oct. 21, 1899.)
(No Model.)

WITNESSES
John Onders Jr.
A. S. Gilbert

INVENTOR
George Meinhardt.
By Henry N. Copp.
Attorney

United States Patent Office.

GEORGE MEINHARDT, OF DONNELLSON, IOWA.

DISK-SHARPENER.

SPECIFICATION forming part of Letters Patent No. 652,917, dated July 3, 1900.

Application filed October 21, 1899. Serial No. 734,333. (No model.)

*To all whom it may concern:*

Be it known that I, GEORGE MEINHARDT, a citizen of the United States, residing at Donnellson, in the county of Lee and State of Iowa, have invented certain new and useful Improvements in Disk-Sharpeners; and I do hereby declare the following to be a full, clear, and exact description of the invention, such as will enable others skilled in the art to which it appertains to make and use the same.

This invention relates to harrow or cultivator disk sharpeners, and has for its object the provision of an improved light and portable machine of inexpensive construction which can be applied to the disk while on the harrow or cultivator, thereby rendering sharpening easy and expeditious.

Having the foregoing object in view, the invention embraces certain novel features and combinations of parts, as will appear more fully hereinafter.

Figure 1:
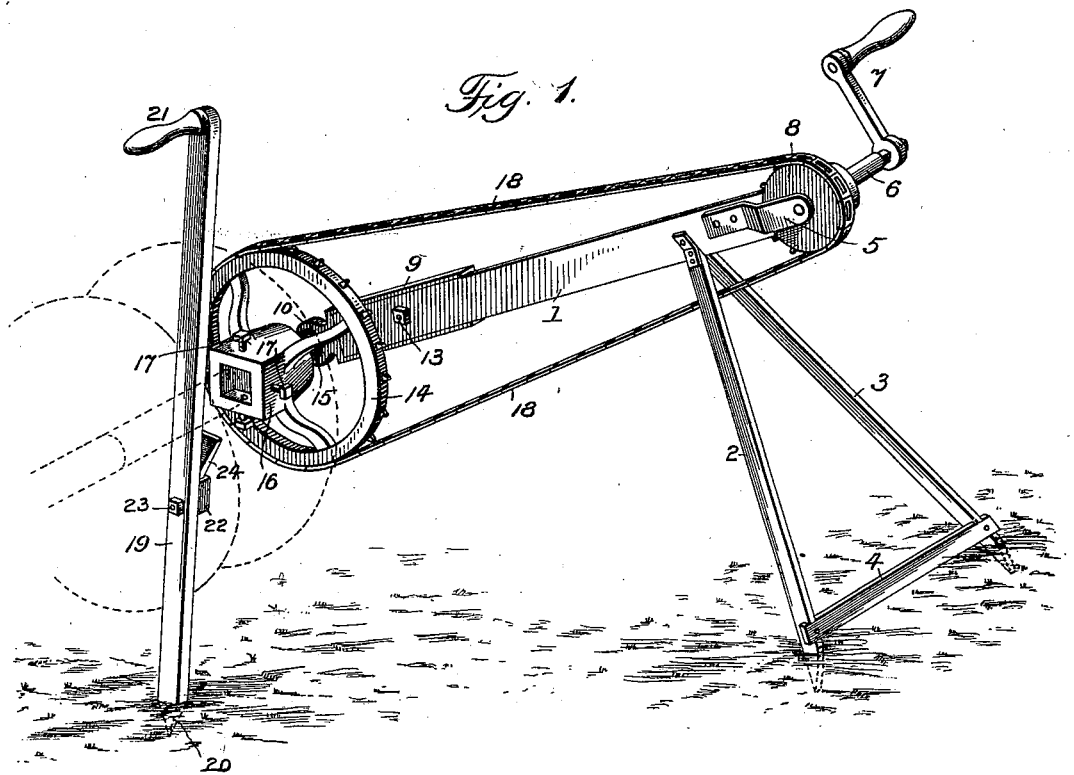
Figure 2:
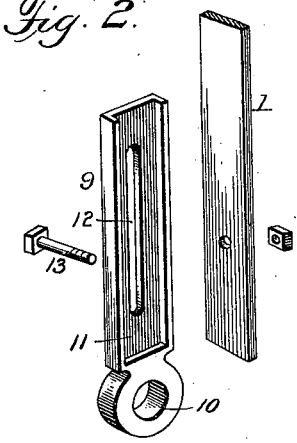
Figure 3:
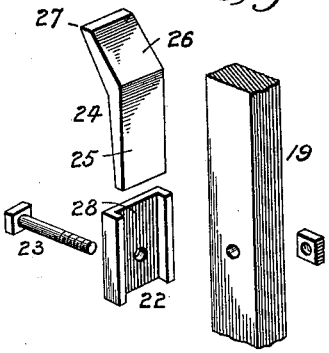

In the accompanying drawings, Figure 1 is a view in perspective of my invention in operative position. Fig. 2 is a detail perspective of the adjustable bearing, and Fig. 3 is a detail perspective of the knife or sharpener.

The frame of the machine consists of an arm 1 and two inclined legs 2 and 3, connected thereto, which are braced near their lower ends by a cross-piece 4. At one end of the arm is a bracket 5, which extends parallel to the arm. A shaft 6, having a suitable turning-handle 7, is journaled in the end of the arm and in the bracket and carries a sprocket-wheel 8 between the two. At the other end of the arm is a plate 9, having a bearing 10 and recessed at 11 on one side to receive the arm and afford a slidable connection therewith without permitting any turning or twisting. The plate has a longitudinally-extending slot 12, which receives the shank of a bolt 13, that passes through the arm.

The numeral 14 designates a large sprocket-wheel having a stub-shaft 15, which is journaled in bearing 10. This sprocket is provided with a square socketed hub 16, which has set-screws 17 in its sides. The socket is designed to receive and hold the nut on the end of the disk axle or shaft, so that said shaft and disk can be rotated and the latter sharpened while on the harrow or cultivator, thus insuring rapidity and ease in sharpening, and the device is made light to permit its being carried to the place where the harrow is located. A sprocket-chain 18 runs over the two sprockets and is brought to the proper tension by adjusting the plate 9. I employ a sharpening-staff 19, having a pointed lower end 20 and a handle 21 at its upper end.

The numeral 22 designates a clamping-plate which is fastened to the side of the staff at a proper height by a bolt 23. This plate is recessed on its inner face for the purpose of holding the sharpening-knife 24, which has one side of its lower half beveled at 25, while its upper portion has a bevel 26, which causes the cutting edge 27 to stand out or away from the side of the staff. The knife is just wide enough to fit snugly in the recess 28 of the plate and lies against the side of the staff when the bolt is tight. The clamping-plate holds the knife firmly in position; but when the knife needs sharpening the bolt can be loosened and the knife easily pulled out.

In using the machine the harrow is raised slightly to cause the disk to clear the ground, and the nut on the axle is then fitted in the socket of the sprocket and there secured by the screws, while the legs are properly positioned to sustain the machine. While one person turns the handle and rotates the disk, another sets the pointed end of the staff on the ground or floor and, using the staff as a lever, holds the sharpening-knife in proper position against the rotating disk. The lever can of course be moved and turned as found necessary and the disk can be rapidly sharpened without difficulty.

Having thus described my invention, what I claim as new, and desire to secure by Letters Patent, is—

1. In a device of the class described, the combination with a staff, of a clamping-plate having a recessed face located next the staff, a bolt passing through the plate and the staff, and a sharpening-knife having one side beveled and provided with a cutting edge offset from said beveled side, said knife being fitted in the recess aforesaid and held against the staff by the plate.

2. In a device of the class described, the combination with a frame composed of an arm and legs connected thereto, of a sprocket journaled in said frame and having a socket and set-screws for securing the axle of the disk therein, a crank-shaft having a sprocket and a chain running over said sprockets.

3. In a device of the class described, the combination with a frame composed of an arm and legs connected thereto, of a plate having a bearing and provided with a longitudinal slot, a bolt passing through the slot and the arm, a sprocket having a stub-shaft journaled in the bearing and provided with a socket and set-screws for clamping the disk-axle therein, a crank-shaft journaled in the arm and having a sprocket, and a chain running over the sprockets.

4. In a device of this class described, the combination with a frame composed of an arm and legs connected thereto, of a plate having a recessed side which receives the arm and provided with a bearing and a longitudinal slot, a bolt extending through the slot and the arm, a sprocket having a stub-shaft journaled in the bearing and itself provided with a socket and set-screws for clamping the disk-axle therein, a bracket secured to the arm, a crank-shaft journaled in the arm and bracket, a sprocket secured on the shaft between the arm and bracket and a chain running over the sprockets.

In testimony whereof I affix my signature in presence of two witnesses.

GEORGE MEINHARDT.

Witnesses:
MARTIN MEINHARDT,
CHRIST. H. KREHBIEL.